United States Patent [19]
Gunzner et al.

[11] Patent Number: 5,265,500
[45] Date of Patent: Nov. 30, 1993

[54] METHOD OF MAKING SHOCK-RESISTANT AND WEAR-RESISTANT TOOLS OF COMPOSITE STEEL STRUCTURE

[75] Inventors: Fred G. Gunzner, Bend; John A. Lanning, Crooked River Ranch, both of Oreg.

[73] Assignee: Dalex, Inc., Redmond, Oreg.

[21] Appl. No.: 3,010

[22] Filed: Jan. 11, 1993

[51] Int. Cl.$^5$ ............................................. B23D 65/00
[52] U.S. Cl. .................................... 76/112; 76/108.1; 76/DIG. 2
[58] Field of Search .............. 76/101.1, 112, 108.1, 76/108.6, 115, DIG. 2

[56] References Cited

U.S. PATENT DOCUMENTS

| | | |
|---|---|---|
| 907,167 | 12/1908 | Neill . |
| 1,535,096 | 4/1925 | Blum . |
| 2,683,923 | 7/1954 | Replogle . |
| 2,833,638 | 5/1958 | Owen . |
| 3,034,378 | 5/1962 | Anderson . |
| 3,034,379 | 5/1962 | Bernstein . |
| 3,063,310 | 11/1962 | Connoy . |
| 3,089,945 | 5/1963 | Connoy et al. . |
| 3,295,396 | 1/1967 | Kolb . |
| 3,315,548 | 4/1967 | Anderson et al. . |
| 4,144,777 | 3/1979 | Nystrom et al. . |
| 4,462,293 | 7/1984 | Gunzner . |
| 4,949,599 | 8/1990 | Iseli ..................... 76/112 |

FOREIGN PATENT DOCUMENTS 2135628 2/1972 Fed. Rep. of Germany ........ 76/112

Primary Examiner—Roscoe V. Parker
Attorney, Agent, or Firm—Chernoff, Vilhauer, McClung & Stenzel

[57] ABSTRACT

A method of making a shock-resistant and wear-resistant composite steel tool comprises providing a steel tool body having a working edge, and providing a working part material of nonporous wrought steel in an unhardened state which is hardenable to a hardness greater than that of the body. The working part material, in its unhardened state, is fused by welding to the working edge of the tool body while being pressed forcibly against the working edge. After the fusion step, the outer surface of the working part material is hardened to a hardness greater than that of the body of the tool, the depth of penetration of such hardening being limited to the region immediately adjoining the outer surface of the material so that the underlying region of the working part remains ductile, and the weld is normalized thereby increasing its ductility and resultant shock resistance. The method is adaptable for economical high production of saw blades, cutting bits, and other tools of composite steel structure having hardened cutting tips or other hardened working parts.

24 Claims, 1 Drawing Sheet

METHOD OF MAKING SHOCK-RESISTANT AND WEAR-RESISTANT TOOLS OF COMPOSITE STEEL STRUCTURE

BACKGROUND OF THE INVENTION

The present invention relates to a method of making tools of the type which are capable of withstanding moderate to severe shock during impact, and yet have a high degree of hardness and resultant wear-resistance. Such tools can include, for example, circular saw blades, bandsaw blades, scraper blades, router bits, drill bits, boring bits, milling cutters and so on.

In order to achieve the twin objectives of shock resistance and hardness in the same tool, it has been customary to use a composite welded structure formed from two or more metals. The working part of the tool, that performs the cutting and/or wear-resisting function, is formed from a hard material such as hardened tool steel or cemented carbide particles. The supporting body of the tool, on the other hand, is formed from a relatively softer, but tough and ductile, material such as low-alloy steel. In order to join such materials by welding to form a particular tool, at least three different types of manufacturing methods have been employed.

In one such manufacturing method, a hardened piece of the material which ultimately will form the working part of the tool is forcibly applied against a designated working edge on the supporting body of the tool and the two parts are fused together by welding. In Gunzner, U.S. Pat. No. 4,462,293, for example, hardened cutting tips are formed using a sintering process which fuses together high-speed steel particles. The respective preformed cutting tips are then individually welded, by resistance welding, while being pressed against the leading edge of respective teeth on a saw blade body made of low alloy steel. Another example of this type of method is shown in Anderson U.S. Pat. No. 3,034,378 and Kolb U.S. Pat. No. 3,295,396, where a hardened cemented carbide rod is used, instead of preformed cutting tips, in order to eliminate the need for equipment to individually handle such tips. In Anderson and Kolb, the hardened rod is of tungsten carbide particles cemented together with a cobalt constituent, but other binders may also be used as explained in Owen U.S. Pat. No. 2,833,638. In performing the fusing step, this hardened rod is pressed against the leading edge of a selected tooth and resistance welding fuses the rod and the tooth directly together, after which the rod is severed to leave a hardened end segment of the rod on such edge.

The difficulty with the above-described type of process is that the surface of the hardened cutting tip or rod which is fused with the supporting edge of the tool body presents a nonuniform porosity due to variation in the sizes of the particles which have been sintered or cemented together. Accordingly, heat absorption and pressure between the two parts being welded are nonuniform over the area of the weld, with some localized areas experiencing relatively poor conditions for cross-junction diffusion. Moreover, the hardness of the tip or rod material inhibits any malleable conformation of the tip or rod surface to the edge surface, even under substantial pressure. These factors result in voids and relatively concentrated carbide grain formation along such areas which, in turn, make the junction subject to crack development and fracture under shock induced stress.

In a second type of steel composite tool manufacturing method, the working part is joined to the supporting body by melting all of the working part material to be joined. For example, in Connoy U.S. Pat. No. 3,063,310, the end segment of a wire or rod made of high-speed steel is heated until a molten bead forms at the end segment. This bead or globule drops from the end segment onto a selected preheated edge of the supporting part and attaches to this edge, whereupon the process is repeated to attach a second bead to the next selected edge. Connoy U.S. Pat. No. 3,089,945 shows a somewhat similar approach except that the rod and the edge are moved in opposite directions in order to form a continuous globule along a single edge of the supporting part. Yet another version of this method, shown in Neil U.S. Pat. No. 907,167, uses a multi-step casting procedure that includes casting a high carbon steel to form the working part upon an already cast ingot of low-carbon steel which serves as the supporting part, whereupon the resulting composite ingot is worked to its approximate final proportions by rolling.

This second type of process, however, also fails to produce uniform welds because, for example, of the poorly controlled variations in heating time and temperature that arise under this method. The molten globule or ingot does not reach all areas of the junction at the same instant nor is heat drawn away evenly from all areas of the junction as the globule or ingot cools. Furthermore, in methods which resemble those of Connoy, the globule may not remain heated along the junction for a sufficient time for adequate diffusion to occur across the junction, thereby resulting in a nonuniform or incompletely fused junction susceptible to shock-induced fracture as explained above. Also, the size of the globules that can be formed using this method is severely limited. Moreover, in these methods which involve formation of the working part from a molten material, the amount of subsequent working and forming needed to obtain the final configuration of the working part is excessively time-consuming and expensive for production purposes.

In a third type of steel composite tool manufacturing method, a length of hardened wrought steel serving as the working part is forcibly applied in lengthwise abutment against an elongate flat edge provided on the supporting part, to which edge it is then fused by welding. Thereafter, the fused parts typically are annealed in order to relieve strain in the steel along the weld, and the working part is subjected to a final heat treatment in order to harden the steel of that part. Either before or after hardening, a major portion of the working part is typically removed either by cutting or grinding so as to provide a plurality of working edges on the tool. This third type of tool manufacturing process is disclosed, for example, in Anderson et al. U.S. Pat. No. 3,315,548 where the working part used is drawn wire of hardened high-speed steel, and fusing is accomplished by electron beam welding after one side of the wire has been ground smooth for better contact with the flat edge of the supporting metal. Anderson et al. explains that resistance welding, which is a considerably less expensive welding process, is disclosed in Blum, U.S. Pat. No. 1,535,096 but that numerous attempts to duplicate the Blum method had met with failure due to brittleness and unacceptable warping of the resulting weld. Similarly, Replogle U.S. Pat. No. 2,683,923 observes that resistance welding results in a poorly diffused junction and suggests arc welding as an alternative. Like Blum, Replogle uses a thinly rolled sheet of hardened high-speed steel for the working part. Nystrom et al. U.S. Pat. No. 4,144,777 demonstrates how this third type of method is applied to the manufacture of circular saw blades. Bernstein et al. U.S. Pat. No. 3,034,379, after observing that the problems of poor melting and brittleness at the weld are associated with this third type of method, suggests an alternative method which results in a three-layer or "sandwiched" joint. Here the outside layers, as before, are made of high-speed steel and low-alloy steel, respectively, and the extra inside or "barrier" layer is made of a thin-rolled annealed strip of steel having high hot hardness and low heat conductivity, preferably containing at least 12% chromium such as provided in certain types of stainless steels.

Notwithstanding the respective improvements to Blum's basic method, Anderson, Replogle, and even Bernstein achieve only partial success in providing uniformly fault-free welds and in controlling warping over the length of the weld. Each of these references, for example, discloses the need for an additional straightening step, typically involving heat treatment, to remove the distortion caused by warping along the weld. Bernstein, in particular, calls for three separate heat treating steps which relate to processing of the weld, the support body, and the working part, respectively. The shortcomings of the welds produced by all of these references arise as a result of poorly diffused welds with localized areas of brittleness, which are the same shortcomings that have also been encountered, as already noted, in welds made by the other prior methods. The hardened state of the working part material prior to welding is at least partially responsible for these problems.

A further disadvantage of the third method is that the cutting or grinding which is undertaken in order to provide cutting edges on the working part of the tool results in a high proportion of the material of the working part being lost or wasted. This waste increases as the size of the edges increase, so that only the manufacture of tools that have fine-edged teeth is economically feasible where the working part is to be formed from a relatively expensive material such as high-speed steel.

Accordingly, it is a principal object of the present invention to provide a method for making hardened tools of composite steel structure in which the risk of shock-induced crack development at the welded junction between the working part and the supporting body of the tool is minimized.

A related object of the present invention is to provide a method for consistently creating an optimal welded junction uniformly over the entire weld area between the working part and the supporting part of a composite steel tool to maximize the shock resistance of the junction.

Another related object of the present invention is to provide a method of the above type which is low in cost and which can be implemented with relatively few processing steps.

SUMMARY OF THE PRESENT INVENTION

The foregoing drawbacks of the prior art are overcome, in accordance with the method of the present invention, by providing a tool body made of steel and having a working edge, and by further providing a working part material of non-porous wrought steel hardenable to a hardness greater than that of the body but which, at time of welding, is in an unhardened, preferably annealed, state and is thus relatively malleable. For example, the body may be of a low-alloy steel while the working part material may be of high-speed steel that has been cast and cold-rolled to a wrought shape, preferably, but not necessarily, an elongate rod. Furthermore, the working part material, after having been worked to its wrought shape, has preferably been annealed in order to reduce the strain hardening brought on by working the wrought steel and to maximize its malleability. This high degree of malleability, in turn, insures that the surface of the working part material will conform evenly to the working edge of the tool body to establish uniform contact with the edge as the working part material is forcibly abutted against the working edge in preparation for the fusing step. Heat is thereupon applied to the abutting portions of the working part material and the working edge in an amount sufficient to melt and diffuse these abutting portions into each other, but insufficient to melt a major fraction of the working part material. This establishes a uniform diffusion zone due to the uniformity of contact, abutment pressure, and heat absorption. If working part material in the form of an elongate rod is used, an end segment of the rod is fused to the working edge and then separated from the rest of the rod so that the end segment is left on the working edge to form the working part of the tool. In any case, after the fusion step, the outer surface of the working part is finally hardened to a hardness greater than that of the body of the tool.

The uniform and shock-resistant welds that consistently result from practicing the method of the present invention can be attributed, in the first instance, to the unhardened, wrought, non-porous condition of the working part material at the time of fusion, the required higher degree of hardness of such material being achieved by heat treatment only after fusion. In contrast, the method identified above as the third prior method begins the fusion step with working part material that is in a more hardened state, while the first and second prior methods use porous hard material or molten material, respectively, all of which inhibit the uniformity of the weld.

In order to reduce wasted material in the working part of the tool, a further aspect of the present invention comprises a manufacturing method in which a steel body is provided for the tool which has a plurality of spaced-apart working edges. An end segment of an elongate rod made of wrought steel in unhardened condition, but hardenable to a hardness greater than that of the body, is used to form the working part of the tool. Abutting portions of the end segment of the rod and a working edge on the body are fused together, and the end segment is separated from the rod to form a first working part. The steps of fusing and separating are repeated in order to form a second working part on a second working edge, and the first and second working parts are optimally hardened. This end-segment-by-end-segment fusing and separating method, where the respective end segments of such a wrought, hardenable rod are individually joined to respective working edges on the body of the tool, stands in contrast to comparable prior art methods in which hardened rods or sheets are fused along their entire lengths to a continuous single edge on the tool body, after which edges are cut into the hardened material instead of being originally provided on the tool body. These prior methods resulted in much waste of the hardened material in order to form the working edges of the tool.

An additional aspect of the method of the present invention relates to further minimizing the risk of shock-induced crack development in the weld and in the working part of the tool. In this aspect of the present method, the outer surface of the working part material, after fusion to the supporting body, is hardened by heat treatment to a hardness which is greater than that of the body, the depth of penetration of such hardening being limited to the region immediately adjoining the outer surface of the material. As a result of this procedure, the material forming the working part of the tool in the region underlying the outer surface of the working part remains more ductile and therefore resistant to shock-induced stress and resultant cracking. Moreover, the weld is annealed or normalized by such heat treatment, thereby increasing its ductility and resultant shock resistance.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

The circular saw blade depicted in the figures is a typical example of the various types of tools, requiring high degrees both of wear resistance and of shock resistance, to which the present invention is applicable. A multiplicity of working parts, in this case cutting tips 10, of relatively hard and wear-resistant character, are attached to the softer and less wear-resistant, but more shock-resistant, steel body 12 of a circular saw blade 14 having an arbor hole 16. In accordance with the present invention, The cutting tips 10 are composed of non-porous, wrought steel hardened to a hardness greater than that of the body 12. The material of the cutting tips 10 is preferably M-2 or M-3 high-speed steel, but may alternatively be other high-speed steels such as those whose chemistries are listed in Connoy U.S. Pat. No. 3,063,310 which is incorporated herein by reference. Each of these steels contains a relatively high carbon content together with relatively high contents of other carbide-forming constituents including vanadium, tungsten, molybdenum and chromium, one or more of which can combine with the carbon to form carbides during heating. Steels having other carbide-forming constituents may also conceivably be used, such as those containing titanium, tantalum, zirconium, uranium, and/or columbium. If desired, other additives such as alumina can be included in the high-speed steel. The amounts of the various constituents in the steel may be variable depending upon the desired ultimate characteristics of the working part, which in turn depends on the balance between shock resistance and wear resistance appropriate for the particular application of the tool. The body 12 of the tool, on the other hand, can be of any satisfactory lower alloy steel, such as AISI-SAE 1010 or 1018 carbon steel, having lesser hardness and wear resistance than the working parts.

Figure 2:
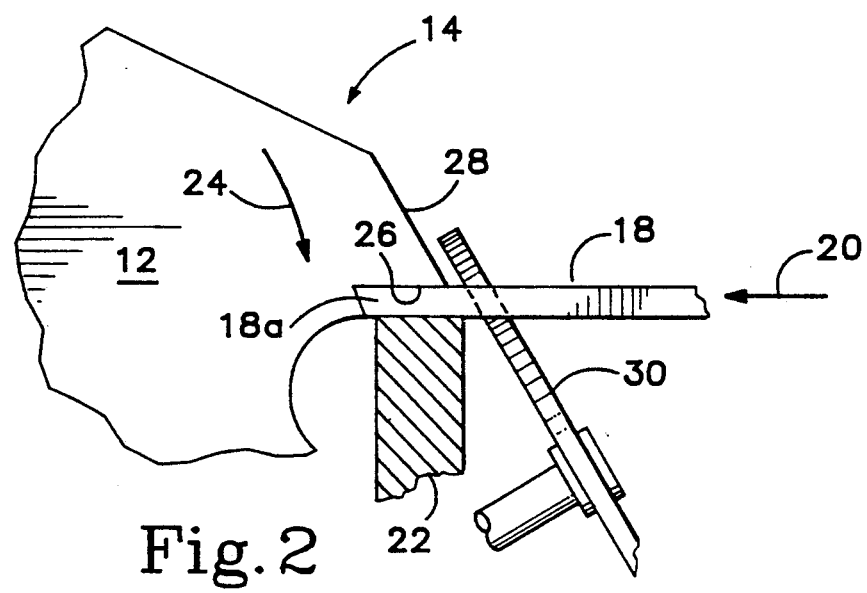
FIG. 2 is an enlarged side view of a tooth of the saw blade of FIG. 1, in the process of having a cutting tip attached thereto in a manner exemplary of the method of the present invention.

In FIG. 2, a preferred method of affixing a cutting tip 10 to the body 12 of the saw blade 14 is depicted schematically. An elongate rod 18 of rectangular cross section is provided, composed of non-porous wrought steel which, although hardenable to a hardness greater than that of the body 12, is in an unhardened, preferably annealed, state. The rod 18 is advanced longitudinally in the direction of the arrow 20 so that an end segment 18a of the rod rests atop an anvil 22. The body 12 of the blade 14, which has been affixed to an arbor shaft passing through the arbor hole 16, is rotated in the direction of the arrow 24 until the working edge 26 of one of the teeth 28 of the saw blade body forcibly abuts the upper side of the end segment 18a, clamping the end segment between the working edge 26 and the anvil 22 as shown in FIG. 2. The working edge 26 and upper side of the end segment 18a are then locally heated by a conventional welding device, such as a resistance welder or electron beam welder, to bring both of them to melting temperature so that the materials of the edge 26 and upper side of the end segment 18a diffuse into each other forming an alloy of the two dissimilar metals. However the energy applied in the welding step is insufficient to melt a major fraction of the end segment 18a. Thereafter, the diffused portions are permitted to cool, thereby fixedly fusing the end segment 18a and the working edge 26 to each other. Then a toothed rotary cutter 30, or other suitable cutting device, is advanced through the rod 18 to separate the end segment 18a from the remainder of the rod. The cutter 30 is preferably advanced through the rod 18 at an angle as shown in FIG. 2 corresponding to the top clearance angle desired for the cutting tip 10.

Thereafter, the rod 18 is longitudinally advanced over the anvil 22 to form a new end segment 18a, the saw blade body 12 is indexed in the direction of the arrow 24 to the next tooth, and the process is repeated until all of the saw blade teeth have cutting tips 10 welded thereto.

After each cutting tip 10 has been welded to its respective working edge 26 of the saw blade body 12, and formed by its separation from the rod 18, it is heat treated to surface-harden it to a hardness which is greater than that of the body 12. The heating may be accomplished by conventional means, such as high-frequency induction, oxyacetylene flame, natural gas flame, or any other suitable means, but the time of heating is carefully restricted so that the depth of heating, and thus the penetration of the ultimate hardening, is limited to the region immediately adjoining the outer surface of the cutting tip material. For example, for an M-2 steel cutting tip, the tip would be heated to a temperature of 1400°-1500° F. to a depth of only 20-30 mils by limiting the time of heating. Upon termination of the heating, the cutting tip is then quenched in a conventional manner, such as with air, argon, or oil, to complete the surface hardening process. As a result of this limited heat treatment procedure, the material forming the cutting tip in the region underlying the outer surface of the tip remains ductile and therefore resistant to shock-induced stresses and resultant cracking. Moreover, the weld is annealed, or normalized, by such heat treatment, thereby increasing its ductility and resultant shock resistance. Any necessary grinding of the individual cutting tips to sharpen them can be performed either before or after the surface hardening process.

EXAMPLE

Figure 1:
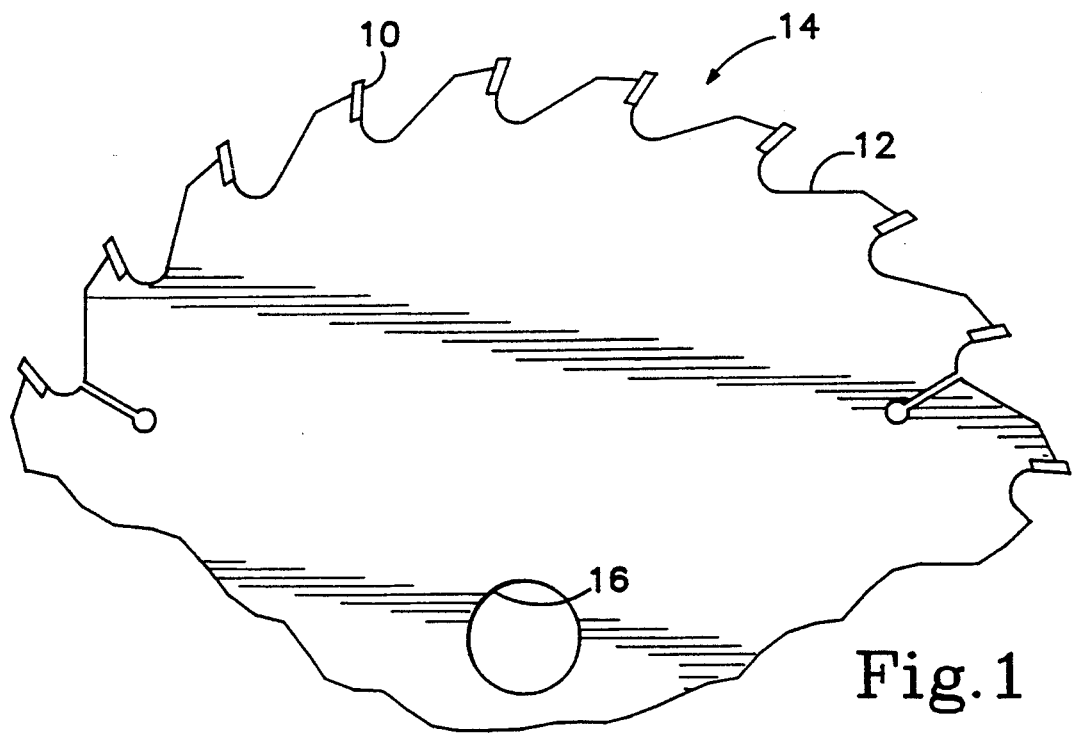
FIG. 1 is a side view of a portion of an exemplary tool constructed in accordance with the present invention, i.e. a circumferential portion of a circular saw blade showing sever with working parts in the form of cutting tips attached thereto.

A circular saw blade body 12 of the type shown in FIG. 1, composed of AISI-SAE 1010 carbon steel 42 mils in thickness, has cutting tips 10 affixed thereto in accordance with the process described above. An elongate rod 18 of M-2 steel in a non-porous, wrought, annealed state is provided having rectangular cross-sectional dimensions of 100 mils by 60 mils. The rod is advanced longitudinally onto an electrically-conductive anvil 22 with one of its wider sides facing downwardly on the anvil and the other wider side facing upwardly for abutment against the working edge 26 of the saw blade body 12. The saw blade body 12 is then rotated in the direction of the arrow 24 into forcible abutment of the edge 26 against the upper side of the end segment of the rod 18, with an abutment force of 80 pounds applied at the abutting surfaces. Fusion welding is performed by a Robotron brand model 30127 electrical resistance welder having its positive electrode attached to the anvil 22 and its negative electrode attached to the body 12 of the saw blade. For a period of 0.033 second, under the application of the aforementioned abutment force, 10 kW of electric power is applied between the electrodes thereby melting and diffusing the abutting portions of the upper side of the end segment of the rod 18 and the working edge 26 together, such electrical heating energy being sufficient to melt only a minor fraction of the end segment. This is followed by air cooling of the weld joint to solidify it and thereby fix the two parts together while the working edge 26 of the saw blade body 12 continues to be forcibly held against the end segment of the rod 18. Thereafter, a rotary toothed cutter 30 is advanced through the rod 18, severing a one-quarter inch length of end segment from the remainder of the rod. The abutment force of the working edge 26 against the end segment is then relieved, and the same procedure is performed on the remaining teeth of the saw blade body 12. Thereafter, each of the cutting tips is individually heat treated by exposing each tip to 7 kW of induction heating power for 0.5 second, immediately after which each tip is quenched in air. Then the side and top surfaces of each cutting tip are ground by removing 10 mils of material to sharpen the tip, leaving an approximately 10–20 mil thickness of surface material in a hardened state from the heat treatment.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of making a tool comprising:
   (a) providing a steel body having a plurality of spaced-apart working edges;
   (b) providing an elongate rod made of non-porous wrought steel and hardenable to a hardness greater than that of said body, said rod being in an unhardened state and having an end segment;
   (c) forcibly abutting said end segment of said rod, while in said unhardened state, and a first one of said working edges against each other;
   (d) during step (c), applying heat to the abutting portions of said end segment and said first one of said working edges sufficient to melt and diffuse into each other both of said respective abutting portions, but insufficient to melt a major fraction of said end segment, and then cooling the diffused portions thereby fixedly fusing said end segment of said rod and said first one of said working edges together;
   (e) after step (d), separating said end segment from the rest of said rod so that said end segment forms a first working part on said first one of said working edges;
   (f) repeating steps (b)–(e) with respect to a second one of said working edges to form a second working part on said second one of said working edges; and
   (g) after step (e), hardening the outer surfaces of said first and second working parts to a hardness greater than that of said body.

2. The method of claim 1 wherein said unhardened state is an annealed state.

3. The method of claim 1 wherein said respective end segments and working edges are forcibly abutted against each other in step (c) in a direction transverse to the length of said elongate rod.

4. The method of claim 1 wherein step (g) includes limiting the depth of penetration of said hardening to the regions immediately adjoining the outer surfaces of said working parts.

5. The method of claim 1 wherein the respective cross-sections of said rod and of said end segment, after said end segment has been separated from said rod in step (e), are substantially of the same shape.

6. The method of claim 1 wherein said rod has a rectangular cross-section.

7. The method of claim 1 wherein step (e) includes cutting said end segment from the rest of said rod along a direction inclined with respect to said first one of said working edges.

8. The method of claim 1 wherein said first and second working parts are formed from a common rod.

9. The method of claim 1 wherein step (d) comprises resistance welding said end segment and said first one of said working edges.

10. The method of claim 1 wherein step (a) includes providing a body having a plurality of spaced-apart toothed edges comprising said working edges.

11. A method of making a tool comprising:
    (a) providing a steel body having a working edge;
    (b) providing an elongate rod made of non-porous wrought steel and hardenable to a hardness greater than that of said body, said rod being in an unhardened state and having an end segment;
    (c) forcibly abutting said end segment of said rod, while in said unhardened state, and said working edge against each other;
    (d) during step (c), applying heat to the abutting portions of said end segment and said working edge sufficient to melt and diffuse into each other both of said respective abutting portions, but insufficient to melt a major fraction of said end segment, and then cooling the diffused portions thereby fixedly fusing said end segment of said rod and said working edge together;
    (e) after step (d), separating said end segment from the rest of said rod so that said end segment forms a working part on said working edge;

(f) after step (e) hardening the outer surface of said working part to a hardness greater than that of said body.

12. The method of claim 11 wherein said unhardened state is an annealed state.

13. The method of claim 11 wherein said end segment and said working edge are forcibly abutted against each other in step (c) in a direction transverse to the length of said elongate rod.

14. The method of claim 11 wherein step (f) includes limiting the depth of penetration of said hardening to the region immediately adjoining the outer surface of said working part.

15. The method of claim 11, including the further step, after step (e), of removing material from said working part.

16. The method of claim 15 wherein said further step is limited so that the geometrical proportions of said working part after said further step substantially conform to the geometrical proportions of said working part before said further step.

17. The method of claim 11 wherein said rod has a rectangular cross-section.

18. The method of claim 11 wherein step (e) includes cutting said end segment from the rest of said rod along a direction inclined with respect to said working edge.

19. The method of claim 11 wherein step (d) comprises resistance welding said end segment and said working edge.

20. The method of claim 11 wherein step (a) includes having a plurality of spaced-apart toothed edges.

21. A method of making a tool comprising:
   (a) providing a steel body having a working edge;
   (b) providing a non-porous wrought steel material hardenable to a hardness greater than that of said body, said material being in an unhardened state;
   (c) forcibly abutting said material, while in said unhardened state, and said working edge together;
   (d) during step (c), applying heat to the abutting portions of said material and said working edge sufficient to melt and diffuse into each other both of said respective abutting portions, but insufficient to melt a major fraction of said material, and then cooling the diffused portions thereby fixedly fusing said material and said working edge together; and
   (e) after step (d), hardening the outer surface of said material to a hardness greater than that of said body while limiting the depth of penetration of said hardening to the region immediately adjoining said outer surface.

22. The method of claim 21 wherein said unhardened state is an annealed state.

23. The method of claim 21, including the further step of partially forming said outer surface by cutting said material from a larger piece of the same said material after step (d).

24. The method of claim 21, including the further step, after step (d), of removing material from said outer surface.

* * * * *

UNITED STATES PATENT AND TRADEMARK OFFICE
CERTIFICATE OF CORRECTION

PATENT NO. : 5,265,500

DATED : November 30, 1993

INVENTOR(S) : Fred G. Gunzner et al.

It is certified that error appears in the above-identified patent and that said Letters Patent is hereby corrected as shown below:

Col. 5, line 28, change "sever" to --several teeth--.

Signed and Sealed this

Twenty-third Day of August, 1994

Attest:

BRUCE LEHMAN

Attesting Officer

Commissioner of Patents and Trademarks